United States Patent [19]
Shigetoyo

[11] Patent Number: 5,335,446
[45] Date of Patent: Aug. 9, 1994

[54] ROOM INSECTICIDE DISPENSER

[75] Inventor: Hiromi Shigetoyo, Tokyo, Japan

[73] Assignee: Nihon Naishi Inc., Japan

[21] Appl. No.: 977,667

[22] Filed: Nov. 18, 1992

[30] Foreign Application Priority Data

Nov. 21, 1991 [JP] Japan .................. 3-332621
Oct. 16, 1992 [JP] Japan .................. 4-304661

[51] Int. Cl.⁵ .............................................. A01M 13/00
[52] U.S. Cl. ........................................ 43/125; 43/129
[58] Field of Search ................................ 43/125, 129

[56] References Cited

U.S. PATENT DOCUMENTS

| | | | |
|---|---|---|---|
| 1,021,270 | 3/1912 | Scott | 43/129 |
| 1,842,900 | 1/1932 | Ell . | |
| 1,861,736 | 6/1932 | Bersie | 43/125 |
| 2,510,126 | 6/1950 | Melcher et al. . | |
| 2,660,828 | 12/1953 | Abrams | 43/129 |
| 3,290,112 | 12/1966 | Gillenwater et al. . | |
| 3,694,146 | 9/1972 | Roy | 43/125 |
| 3,793,763 | 2/1974 | Griffin et al. . | |
| 3,807,082 | 4/1974 | Hautmann et al. . | |
| 4,228,124 | 10/1980 | Kashihara et al. . | |
| 4,860,488 | 8/1989 | Shigetoyo . | |
| 4,938,144 | 7/1990 | Demarest | 43/125 |
| 4,966,755 | 10/1990 | Smith | 43/125 |

FOREIGN PATENT DOCUMENTS 49-25097 6/1974 Japan .

Primary Examiner—Kurt C. Rowan
Attorney, Agent, or Firm—Lucas & Just

[57] ABSTRACT

The dispenser has a fan and an insecticide in its cavity. Upon control signals from a controller in the "in use" mode, the fan is started and shutters provided at an inlet and outlet are opened, while in the "not in use" mode, the fan is stopped and the shutters are closed. When one of the individual timers is selected, the controller issues control signals at times specified by the individual timers within a time period previously specified by the main timer. When the dispenser is in the "not in use" mode, the shutter isolates the cavity from the outside.

10 Claims, 7 Drawing Sheets

ROOM INSECTICIDE DISPENSER

This invention relates to an insecticide dispenser used indoors. More specifically, this invention relates to an insecticide dispenser which automatically releases insecticide continuously or intermittently within a time period set by an operator so as to eliminate cockroaches, flies, mosquitoes and other harmful insects from the interior of restaurants or kitchens. Further, the term "indoor" is not limited to the interior of restaurants or kitchens, and may also be used in the wide sense of ordinary households, buildings or sports facilities, etc.

Harmful insects such as cockroaches, flies and mosquitoes infest human habitations, and as most of them carry antigens that cause disease, they must be eliminated from the viewpoint of public hygiene. This is of particular importance in locations which sell food such as restaurants, coffee shops or supermarkets.

The presence of these insects in public eating places gives customers a bad impression by raising doubts as to the cleanliness of the establishment and the safety of the food, and the ability of the restaurant to attract customers is consequently impaired.

In addition to the problem of public health, therefore, it is necessary to exterminate harmful insects also from the viewpoint of their impact on business performance. This is done as a regular practice not only in restaurants, but also in ordinary households, offices, indoor swimming pools and sports facilities.

The method employed in the past was to seal off a room and fill it with insecticide for a predetermined time. According to this method, the insecticide penetrates the entire room, including cracks, and it is therefore highly effective.

This method, however, has the following drawbacks:
(1) A certain time is required for the insecticide to permeate the whole room.
(2) Persons often cannot enter the room while the insecticide is being dispersed, so the room cannot be used during this period.
(3) Even after all the insects have been exterminated, other insects may hatch or enter the room from the outside. It is, therefore, necessary to continue use of the product after a certain time interval.

In the past, the aforesaid problem (1) was solved by using an electric fan installed in the insecticide dispenser to forcibly disperse the insecticide in the room. Problems (2) and (3) were solved by setting the operating time of the electric fan to disperse insecticide continuously while the room was not in use, e.g. at night.

In the aforesaid conventional room insecticide dispenser, air aspirated by the electric fan is expelled from an outlet together with insecticide, and the insecticide has to be in vapor form inside the dispenser. The insecticide used should, therefore, have a high vapor pressure and volatilize continuously at room temperature. In practice, solids and liquids are mainly used since they are easier to handle and generally last a long time.

In the case of conventional insecticide dispensers, however, the dispenser inlet and outlet remain open even when the dispenser is not in use. Thus, the insecticide contained therein is in constant contact with the outside air. Insecticide which is present as a vapor at room temperature is therefore released to the outside when the dispenser is not in use. If the insecticide is odorless, it cannot readily be detected and presents a threat to human safety.

If the dispenser was provided with a timer, it automatically dispensed insecticide continuously every day within a set time period. However, no attempt was made to adjust this time period to the species of insect to be exterminated.

Cockroaches, for example, tend to develop resistance to insecticide, so it might be preferable to operate the dispenser, e.g., only at night (i.e. when humans are inactive) on every other day. Flies and mosquitoes, on the other hand, are mainly active during the day when humans are active, and from the viewpoint of public safety, it would be preferable to operate the dispenser intermittently for short periods. In the prior art, no provision was made for such differences.

Moreover, if the timer was incorrectly set when attempting to eliminate cockroaches, the fan would dispense more insecticide than was necessary. This is not only waste of insectide, but also generates high concentrations of insecticide, which poses a potential threat to humans.

It is therefore an object of this invention to maintain human safety and avoid wastage by preventing insecticide from being released when the dispenser is not in use, and to dispense insecticide more effectively by including a function to set the timer for each type of insect.

These and other aspects of the present invention are accomplished by using a room insecticide dispenser having an air inlet port and an insecticide outlet port; a plurality of insecticide plates, said plates being juxtapositioned with one another and having a set spacing between each of said plates, said plates being positioned inside said dispenser; a motorized fan for drawing air in through said inlet port and over said plates and expelling said air through said insecticide outlet port; a heater for heating the plates to vaporize insecticide when the temperature is below about 25° C.; and a main timer for setting the operating time for said fan and said heater. The controller is provided with output signals to start and stop said fan and to open and close said shutters according to the setting of the main timer. The inlet and outlet are closed by said shutters upon said closing signal from said dispenser controller in the "not in use" mode when said fan has stopped such that the insecticide inside the cavity does not escape from the dispenser.

These and other aspects of the present invention may be more fully understood by reference to the drawings wherein.

Figure 3:
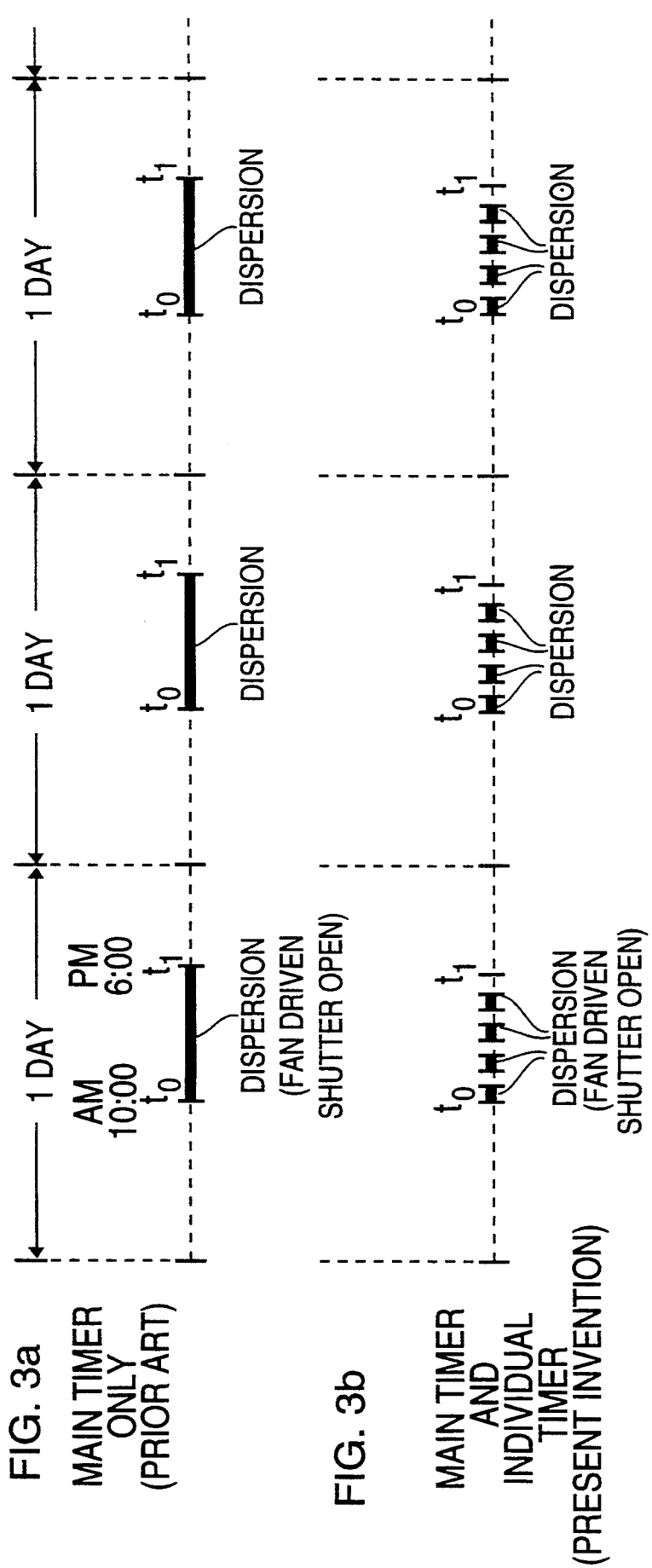
Figure 4:
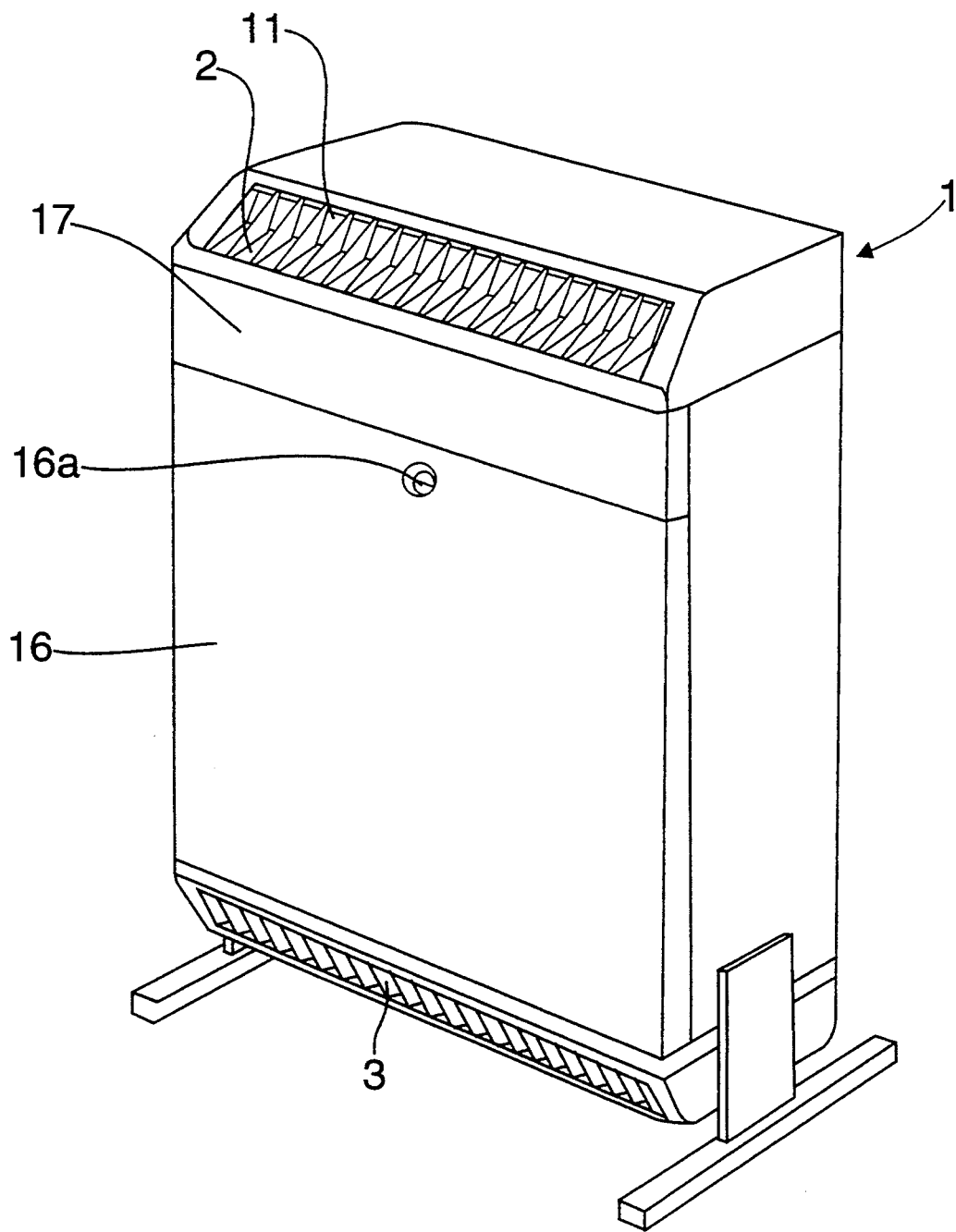
Figure 5:
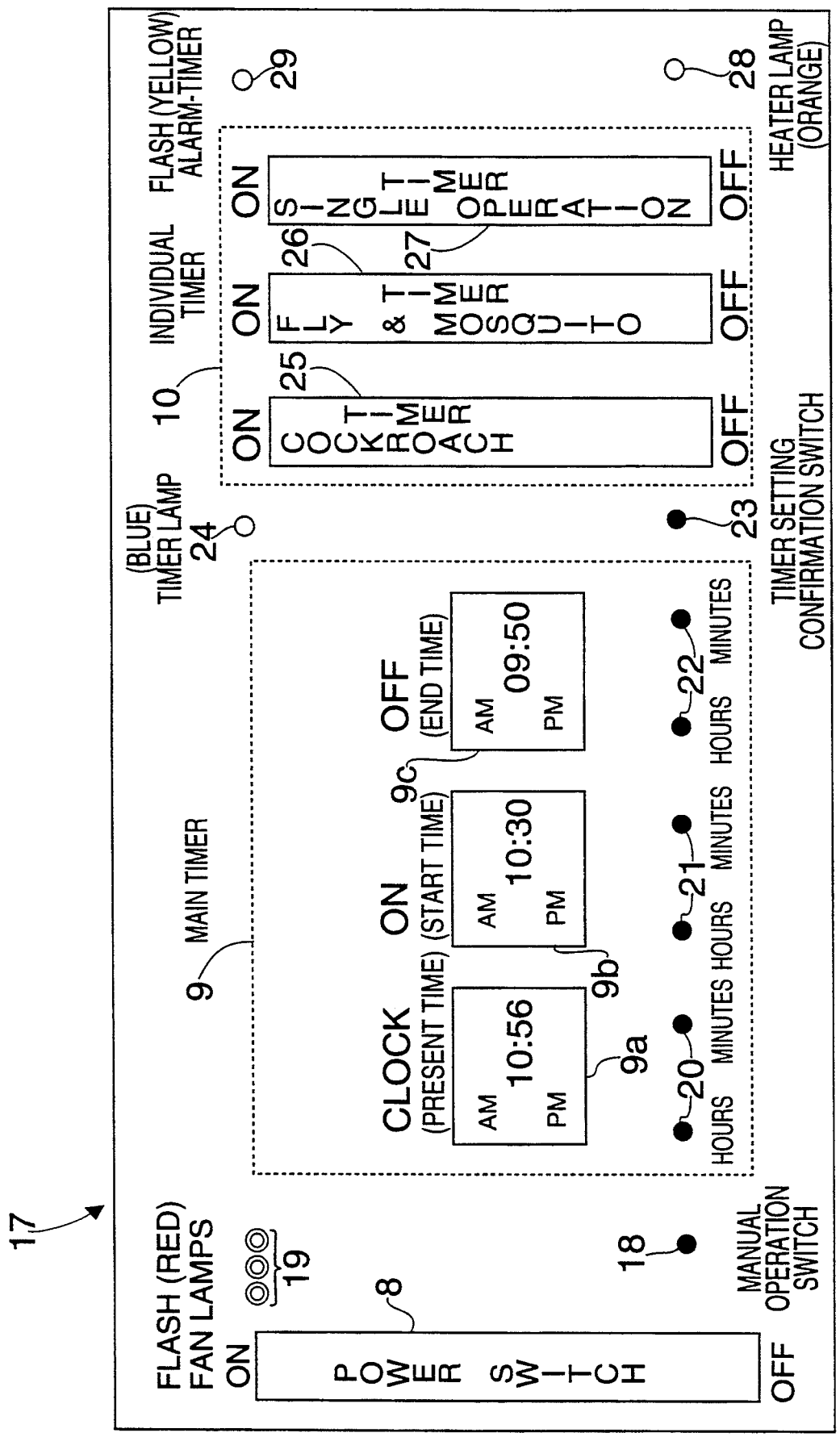
Figure 6A:
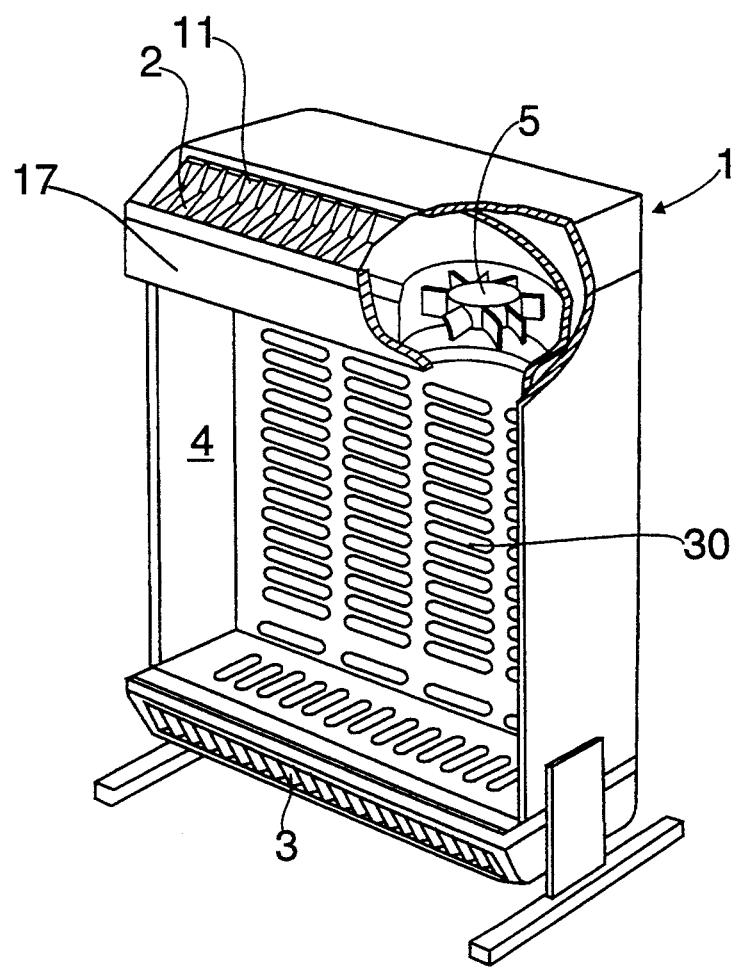
Figure 6B:
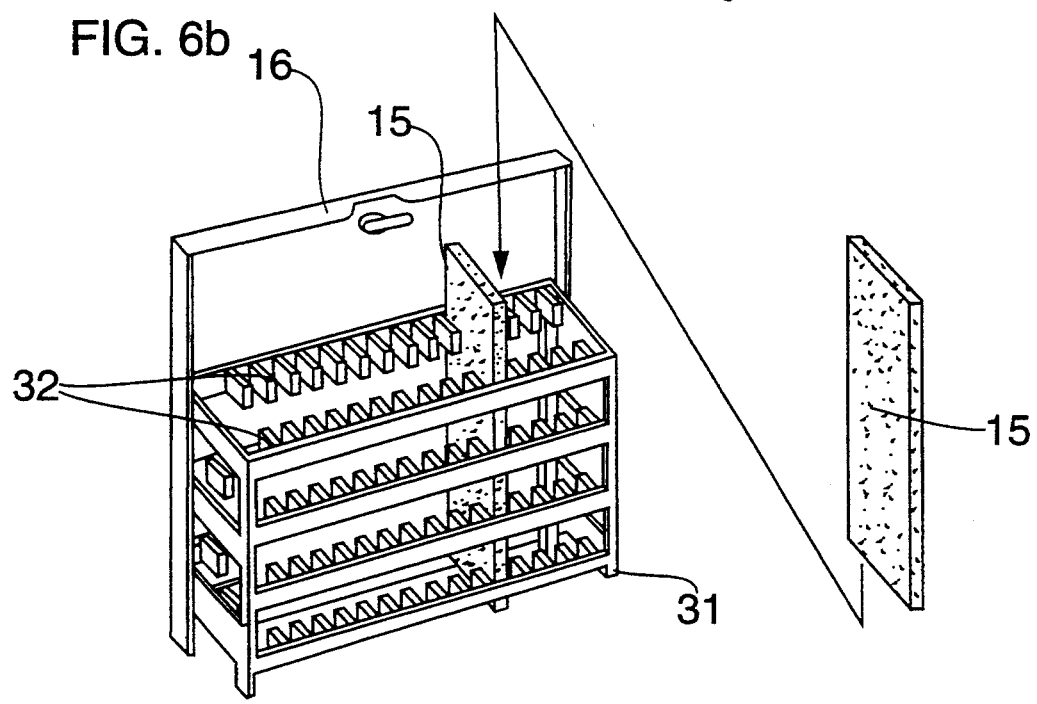
Figure 7:
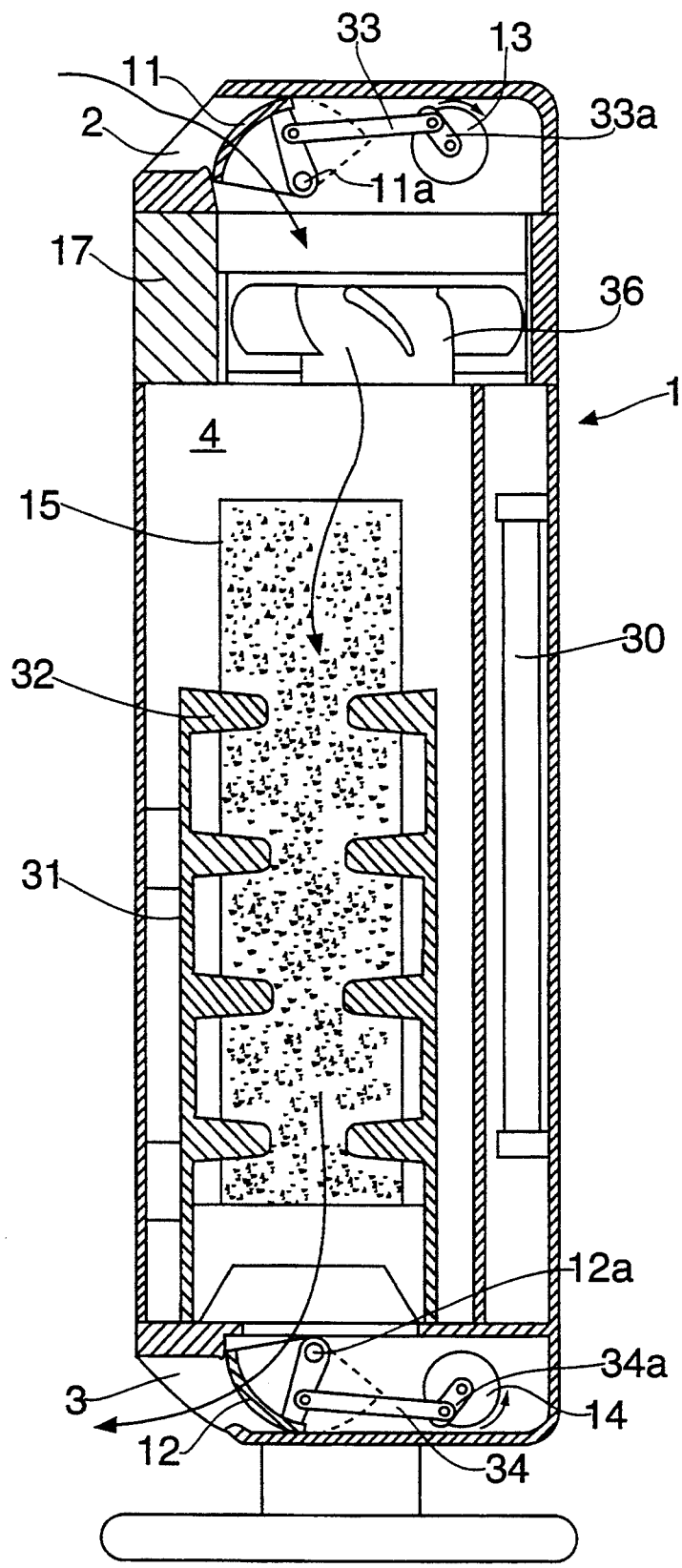

FIGS. 3(a) and 3(b) show the time zones during which insecticide is dispersed in each operating mode, FIG. 3(a) showing the conventional case where only a main timer is used, and FIG. 3(b) showing the case where both a main timer and an individual timer are used;

FIG. 4 is an oblique view showing on embodiment of the room insecticide dispenser of this invention;

FIG. 5 is a front view showing the control panel of the room insecticide dispenser of FIG. 4;

FIGS. 6(a) and 6(b) are other views of the room insecticide dispenser of FIG. 4, FIG. 6(a) being an oblique view with the cover open, and FIG. 6(b) being an oblique view of the underside of the cover; and FIG. 7 is a section of the room insecticide dispenser of FIG. 4.

Figure 1:
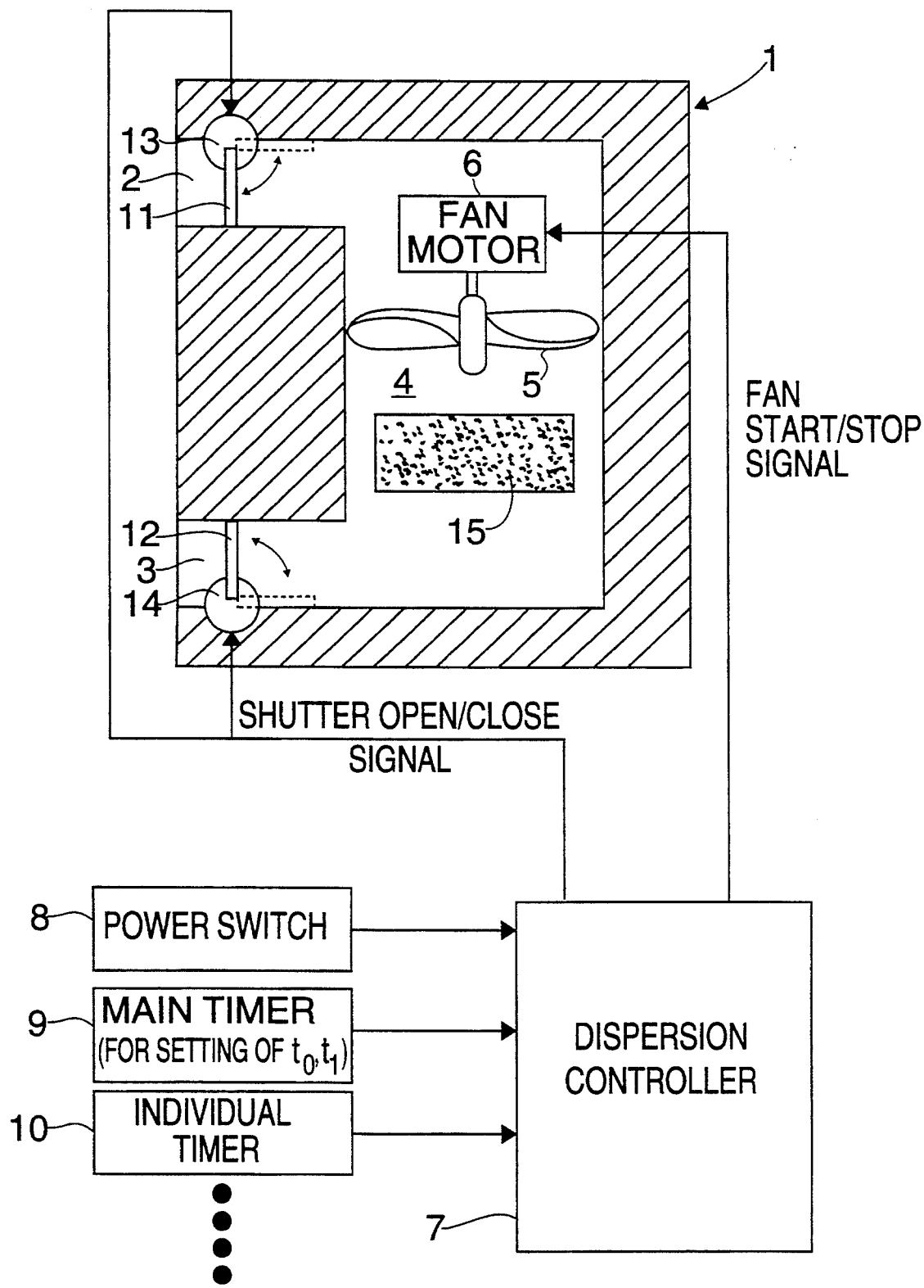
FIG. 1 shows the basic construction of the apparatus of this invention.

As shown in FIG. 1, the basic layout according to the present invention includes a room insecticide dispenser 1; an inlet 2 and an outlet 3; a cavity 4; a fan 5 with a fan drive motor 6; a dispersion controller 7; a power switch 8; a main timer 9 for setting a time $t_0$ and a time $t_1$ at which the dispenser begins and stops dispensing insecticide every day; individual timers 10 for setting the mode in which insecticide is dispersed according to the type of target insect within the time interval set by the main timer 9; shutters 11 and 12; motors 13 and 14; and an insecticide 15.

The cavity 4 is formed inside the dispenser which connects the inlet 2 and outlet 3. The fan 5 provided in the cavity 4 is driven by the fan drive motor 6 so as to aspirate air from the inlet 2 and expel it from the outlet 3, and the insecticide 15 in the cavity 4 has a high vapor pressure at room temperature so that it volatilizes continuously.

The shutters 11, 12 can be moved so as to open and close the inlet 2 and outlet 3, these shutters being driven by motors 13, 14. The motors 13, 14 keep open the inlet 2 and outlet 3 when the fan 5 is operating, and keep both shut when the fan is not operating. The shutters 11, 12 are therefore linked to the operation of the fan 5.

Figure 2:
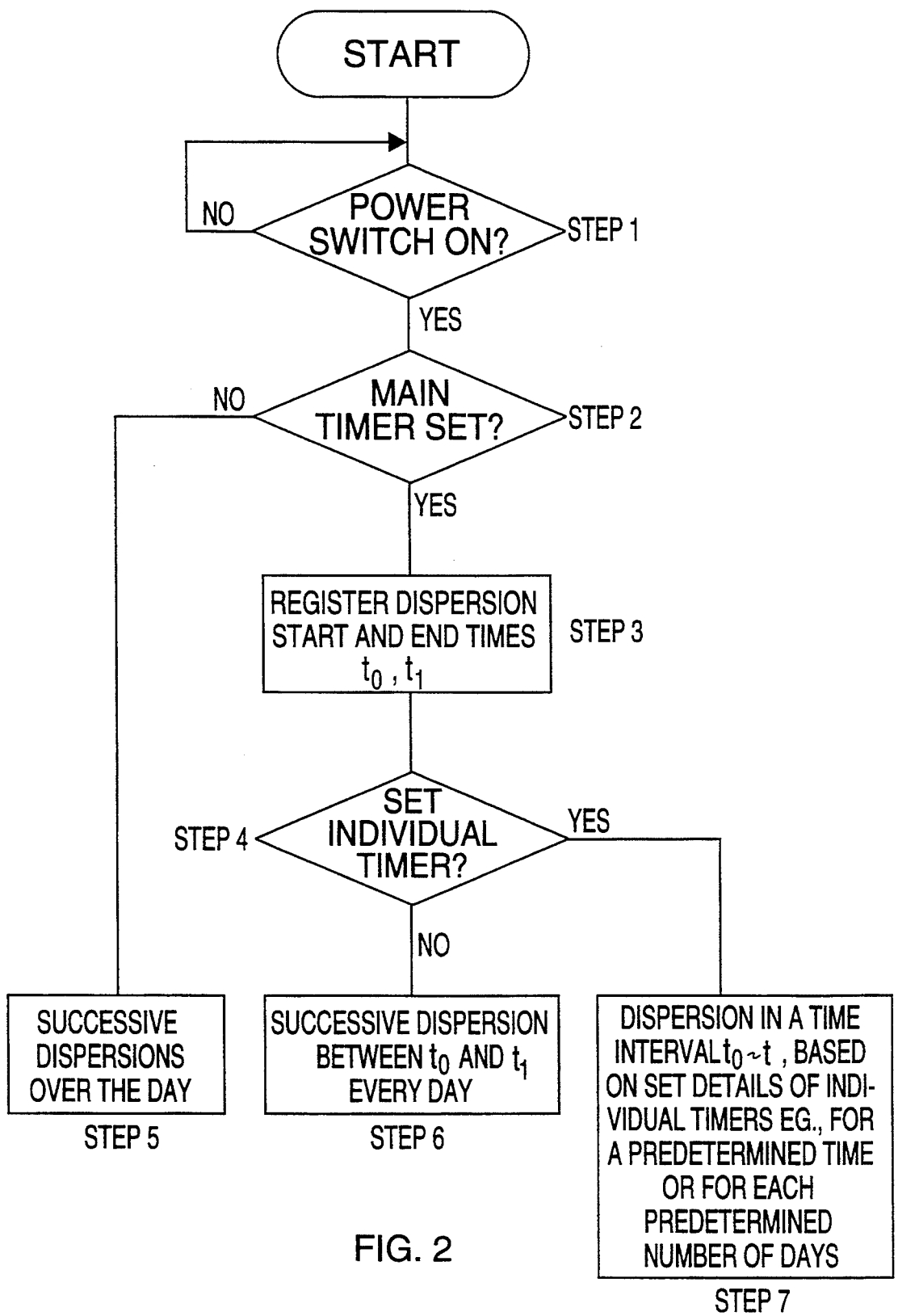
FIG. 2 is a descriptive drawing showing the data processing steps performed by the dispenser.

The control procedure in the controller 7 follows the steps as illustrated in FIG. 2 wherein:

Step (1)—It is judged whether or not the power switch 8 is ON. If the answer to this question is [YES], the program proceeds to the next step. If the answer is [NO], the question is repeated.

Step (2)—It is judged whether or not the main timer 9 is set. If the answer to this question is [YES], the program proceeds to the next step. If the answer is [NO], the program proceeds to step (5).

Step (3)—The times for starting and ending dispersion of insecticide $t_0$ and $t_1$ which have been set by the main timer 9 are stored in a memory, not shown. The time period determined by $t_0$, $t_1$ during which insecticide is dispersed need not be unique, and several such periods may be set in one day.

Step (4)—It is judged whether or not the individual timers 10 for selecting the type of insect have been set. If the answer to this question is [YES], the program proceeds to step (7), and if the answer is [NO], the program proceeds to step (6).

Step (5)—The dispenser 1 is put in continuous operation by issuing a start fan signal and shutter open signal, and insecticide is released until the final day of a set period. As this may have an adverse effect on the health of the people in the room, an alarm may be issued instead to initiate setting of the main timer 9.

Step (6)—Continuous operation between the start time $t_0$ and end time $t_1$ is repeated daily by issuing a fan start signal and shutter open signal at time $t_0$, and a fan stop signal and shutter close signal at time $t_1$.

Step (7)—Fan start/stop and shutter open/close signals are issued so that insecticide is dispersed within a time period between the set start time $t_0$ and end time $t_1$ according to the specifications of the individual timers 10, and this operation may, for example, be repeated at a predetermined time T or for a predetermined number of days.

In the dispenser 1 of this invention, the inlet and outlet are opened and closed by shutters in conjunction with the operation of the fan. When both the inlet and outlet are open, insecticide vapor inside the cavity is expelled together with air aspirated from the inlet. When the operation stops, i.e. when the fan stops, both the inlet and outlet are closed so that insecticide does not escape into the environment.

By adding individual timers to specify the operating mode within the permitted operating time set by the main timer, the dispenser can be made to operate in specific time zones corresponding to the user modes of steps (6) and (7) in FIG. 2 and as shown in FIGS. 3(a) and 3(b).

In FIGS. 3(a) and 3(b), the main timer 9 is set to [$t_0$=10:00 a.m., $t_1$=6:00 p.m.] and an individual timer 10 is set to [T=1 hour]. If only the main timer 9 is set (step 6), then insecticide is dispersed continuously during the eight-hour period from 10 a.m. to 6 p.m. every day as shown in FIG. 3(a). On the other hand, if both the main timer 9 and the individual timer 10 are set (step 7), insecticide can be dispersed e.g. during the hours 10 a.m.–11 a.m., 12 noon–1 p.m., 2 p.m.–3 p.m. and 4 p.m.–5 p.m. every day as shown in FIG. 3(b). These time intervals have been chosen for purposes of illustration only.

FIG. 4 is an oblique view showing the whole of the room insecticide dispenser 1 of this invention. The dispenser 1 is provided with an inlet 2 on the upper front, an outlet 3 on the lower front, and a front cover 16 which can be removed by operating a lock 16a. A control panel 17 is also provided on the upper front.

The control panel 17 is as shown in FIG. 5, and is provided with the following controls and displays.

When the upper part of a power switch 8 is pressed, the dispenser 1 switches ON with either AC or DC power, and when the lower part of the switch is pressed, it switches OFF. The dispenser is also provided with a power lamp (not shown) which lights when the dispenser 1 is switched ON.

A manual operating switch 18 can be used to determine whether or not the fan 5 is rotating and the shutters 11, 12 are open. If this switch is pressed, the setting of the main timer 9 is overridden, and three red fan lamps 19 flash ON and OFF alternately. By observing these flashing lights, the user can ascertain whether or not the dispenser is operating correctly. Moreover, users not familiar with the operation of timers can use this switch 18 to activate the dispenser without using the timers.

If the switch 18 is pressed again, the dispenser enters the stop mode. Subsequent time operations are possible only in the stop mode.

The main timer 9 is a 24-hour timer for setting the dispersion start and end times $t_0$ and $t_1$ every day. It comprises set buttons 20, 21, 22 and liquid crystal displays 9a, 9b, 9c for indicating present time, operation start time and operation end time, respectively.

By pressing the set buttons 20, 21, 22, the time displayed by the displays 9a, 9b, 9c changes, including the indication of "a.m." and "p.m." If the buttons are released when the desired time is displayed, the desired time continues to be displayed. Each of the buttons 20, 21, 22 comprises a pair of buttons, one for hours and one for minutes. When each of the minute buttons is pressed for the pair of buttons 21, 22, the minute display varies in 10-minute units. The minute button for the buttons 20 varies in 1—minute units.

A timer setting check switch 23 is used when it has been verified that the times displayed by the displays 9a, 9b, 9c are correct. If this switch is pressed, the setting of the main timer 9 is validated and the same timer operation is repeated every day. If this switch is pressed again, the main timer 9 returns to the state where the present time, start time $t_0$ and end time $t_1$ can be reset by pressing the buttons 20, 21, 22. Further, in the above validation state, a timer lamp 24 lights.

If a cockroach timer 25 is switched ON, a built-in timer lamp (not shown) lights, and insecticide is dispersed between the start time $t_0$ and end time $t_1$ for a predetermined number of days, e.g. every other day. This procedure is designed to avoid the cockroaches becoming accustomed to the insecticide every day and to maintain its effect over a long period. Also, if the main timer 9 is set in excess of a predetermined time, e.g. ten hours, the cockroach timer 25 stops automatically after the predetermined time has elapsed from the start time in order to maintain human safety and to prevent the cockroaches from becoming accustomed to the insecticide. If the main timer 9 is set within the predetermined time, the dispenser stops at that time. The setting of the cockroach timer 25 is valid provided the other individual timers are OFF. It should be understood that "every other day" or "ten hours" are typical predetermined settings, and may be changed depending on the behavior of the insects or human safety considerations.

A fly and mosquito timer 26 is a separate timer for exterminating flies and mosquitoes. If it is switched ON, a built-in lamp (not shown) lights, and insecticide is dispersed every day for a predetermined time, e.g. intermittently every other hour, within the time period from the start time $t_0$ to the end time $t_1$ set by the main timer 9. This procedure is followed because flies and mosquitoes are active at the same time as humans, and the insecticide is toxic by inhalation. By dispersing the insecticide intermittently at predetermined times, most of the flies and mosquitoes are killed. In the following short time interval when the dispenser is not operating, however, the insecticide is diluted by ventilation, people coming in or going out of the room and decomposition by moisture in the air which greatly increases the level of human safety. The setting of the fly and mosquito timer 26 is valid provided the other individual timers are OFF. Further, as with the cockroach timer 25, the predetermined setting of the fly and mosquito timer 26 is not necessarily limited to "every other hour."

A one-touch timer 27 disperses insecticide once from the start time $t_0$ to the end time $t_1$ set by the main timer 9. This timer is used when it is not desired to disperse insecticide continuously every day or every other day, but only once when necessary. If the time period from the aforesaid time $t_0$ to the aforesaid time $t_1$ as set by the main timer 9 exceeds a predetermined time determined by the effect of the insecticide on humans, e.g. six hours, the dispersing action is finally stopped when the predetermined time is reached.

A heater lamp 28 lights when a heater 30, described hereinafter, operates.

An alarm lamp 29 flashes yellow when there is a fault in the operation of the fan 5 or the shutters 11, 12. This alarm operates if the shutters 11, 12 do not close when the fan stops as they are supposed to do, excepting when the power is turned off (e.g. when there is a power failure or when the power is suddenly cut off).

FIG. 6(a) shows the room insecticide dispenser 1 with the cover 16 removed. The cavity 4 connects the inlet 2 and outlet 3, and the fan 5 is situated between the cavity 4 and inlet 2. A heater 30 is provided on the rear face of the cavity 4.

As shown in FIG. 6(b), a cassette 31 is provided on the rear of the cover 16 such that it can be freely attached or detached. A plurality of supporting projections 32 are formed on this cassette 31, the insecticide 15 being supported between these projections 32.

The chemical used for the insecticide may be DDVP (dichlorvos) which has a high vapor pressure and which volatilizes at room temperature. This is toxic by inhalation for insects, and the amount dispersed in the room is adjusted by the number of pieces of insecticide 15 installed. If each piece of insecticide 15 is a sheet of dimensions 250 mm long×65 mm wide×6 mm thick, one piece per 2 "tsubo" (3.3 square meters) is sufficient to kill flies and mosquitoes and 2 pieces per 1 "tsubo" is sufficient to kill cockroaches. If the DDVP is incorporated in a plastic sheet, it retains its efficacy for the aforesaid dimensions during a period of approximately 3 months, and the optimum amount of insecticide is released at a temperature above about 25° C.

It will be understood, however, that the type of insecticide is not limited to DDVP.

FIG. 7 is a section in profile of the room insecticide dispenser 1. A shutter 11 which can be rotated about an axis 11a is provided to open and close the inlet 2. This shutter 11 is connected to one end of a rotating member 33a via a connecting member 33, the other end of this rotating member 33a being fixed to the axis of a motor 13 fitted inside the room insecticide dispenser 1. When the motor 13 is driven, the rotating member 33a rotates so that one of its ends pulls the connecting member 33 backwards. This causes the shutter 11 to rotate about its axis 11a and move backwards so as to open the inlet 2. If the motor 13 is driven in the opposite direction, the shutter 11 is pushed forward and rotates about the axis 11a so as to close the inlet 2.

In the same way, the outlet 3 is provided with a shutter 12 which rotates about its axis 12a so as to open and close the outlet. This shutter 12 is connected to one end of a rotating member 34a via a connecting member 34, the other end of this rotating member 34a being fixed on the axis of a motor 14 installed in the room insecticide dispenser 1. When the motor 14 is operated, the rotating member 34a rotates so that one of its ends pulls the connecting member 3 backwards. This causes the shutter 12 to rotate about its axis 12a and move backwards as shown by a dotted line in the drawing so as to open the outlet 3. Conversely, if the motor 14 is driven in the reverse direction, the shutter 12 is pushed forward and rotates about the axis 12a so as to close the outlet 3.

These motor drives 13, 14 are linked to the operation of the fan 5. In other words, when a signal to start the fan 5 and signals to open the shutters 11, 12 are issued by the controller 7, the fan 5 rotates ("in use" mode), and the shutters 11, 12 are pushed backward so as to open the inlet 2 and outlet 3. Air is thereby aspirated by the fan 5 into the cavity 4, and when it passes between the plurality of insecticide sheets 15 arranged in the cavity 4, it mixes with insecticide vapor to be expelled from the outlet 3. Conversely, when a signal to stop the fan 5 and signals to close the shutters 11, 12 are issued by the controller 7, the fan 5 stops ("not in use" mode), and the shutters 11, 12 are pushed forward so as to close the inlet 2 and outlet 3. In this way, the cavity 4 is isolated off from the outside and insecticide vapor does not escape from the dispenser.

If the temperature of air aspirated from the inlet 2 is low, the insecticide does not volatilize properly, so that it is inefficiently dispersed and the desired effect may not be obtained. In this case, the heater 30 provided on the rear face of the cavity 4 is switched on to raise the temperature of the cavity 4 and promote efficient volatilization of insecticide. The heater 30 is preferably a 120 V, 100 W surface heater, and it is operated only when the fan 5 is operating. It also has a thermostat arranged to switch it on when the temperature of the incoming air is between 25° and 12° C., for example.

When this room insecticide dispenser 1 is used to exterminate flies and mosquitoes, it should preferably be installed such that the outlet 3 is slightly above head level, but when it is used to exterminate cockroaches, it should preferably be installed with the outlet 3 at floor level for a period of approximately eight hours.

As a minimum, the present invention comprises shutters 11, 12 each provided at air inlet 2 and outlet 3 of insecticide dispenser 1, fan 5 and insecticide 15 contained in cavity 4. The present invention is adapted such that shutters 11, 12 are provided at air inlet 2 and outlet 3 of the indoor insecticide dispenser respectively and are closed upon non-use of dispenser 1, whereby vapor from insecticide 15 is prevented from being inadvertently released to the outside of the dispenser, and such that the opening and closing operations of shutters 11, 12 and the driving and stopping operations of the fan are respectively changed over through the manual operating switch and/or the timer.

The manual operating switch may be provided for changing over the operations of fan 5 and of shutters 11, 12 at an arbitrary point in time, the switch being employed together with main timer 9 and the like. If desired, main timer 9 may be omitted and the operations of fan 5 and of shutters 11, 12 may be changed over chiefly through the manual operating switch.

Manual operating switch 18 is to actuate the insecticide dispenser, i.e. to drive fan 5 and open shutters 11, 12 by being turned through depression thereof wherein three red fan lamps 19 are alternately flashed repeatedly to indicate that the dispenser is in operation. Manual operating switch 18 may also be divided into a driving/-stopping operation means for fan 5 and an opening/closing operation means for shutters 11, 12 (not shown) for individual separate operations thereof.

In the case where the power switch is turned on, the method of actuating heater 30 is as follows:
 forcedly actuating heater 30 at an arbitrary time with the manual switch;
 automatically actuating heater 30 by using a thermostat, when cavity 4 reaches a predetermined temperature; or
 actuating heater 30 by using a thermostat in series connection with the foregoing manual switch.

It will be understood that the claims are intended to cover all changes and modifications of the preferred embodiments of the invention herein chosen for the purpose of illustration which do not constitute a departure from the spirit and scope of the invention.

What is claimed is:

1. In a room insecticide dispenser having an air inlet port and an insecticide outlet port; a plurality of insecticide plates, said plates being juxtapositioned with one another and having a set spacing between each of said plates, said plates being positioned inside said dispenser; a motorized fan for drawing air in through said inlet port and over said plates and expelling said air through said insecticide outlet port; a heater for heating the plates to vaporize insecticide when the temperature is below about 20° C.; and a main timer for setting the operating time for said fan and said heater, the improvement comprising:
 an inlet shutter means mounted in said dispenser for opening said inlet when said dispenser is in use and closing said inlet when said dispenser is not in use;
 an outlet shutter means mounted in said dispenser for opening said outlet when said dispenser is in use and closing said outlet when said dispenser is not in use;
 a controller means mounted in said dispenser for controlling both said inlet shutter means and said outlet shutter means, said fan and said heater such that when said inlet shutter means opens said inlet and said outlet shutter means opens said outlet, said fan is on, and when said inlet shutter means closes said inlet and said outlet shutter means closes said outlet, said fan is off thereby preventing the escape of insecticide from said dispenser.

2. The dispenser of claim 1 wherein said insecticide plates are housed in a cassette which is mounted in and detachable from the main body of the dispenser.

3. The dispenser of claim 1 wherein said controller has an individual timer for specifying a particular type of operation within the range of operation set by the main timer.

4. The dispenser of claim 3 wherein said individual timer is a fly and mosquito timer for specifying operation at predetermined times.

5. The dispenser of claim 3 wherein said individual timer is a cockroach timer for specifying operation for a predetermined number of days at a time.

6. In a room insecticide dispenser having an air inlet port and an insecticide outlet port; a plurality of insecticide plates, said plates being juxtapositioned with one another and having a set spacing between each of said plates, said plates being positioned inside said dispenser; a motorized fan for drawing air in through said inlet port and over said plates and expelling said air through said insecticide outlet port; and a main timer for setting the operating time for said fan, the improvement comprising:
 an inlet shutter means mounted in said dispenser for opening said inlet when said dispenser is in use and closing said inlet when said dispenser is not in use;
 an outlet shutter means mounted in said dispenser for opening said outlet when said dispenser is in use and closing said outlet when said dispenser is not in use;
 a controller means mounted in said dispenser for controlling both said inlet shutter means and said outlet shutter means, and said fan such that when said inlet shutter means opens said inlet and said outlet shutter means opens said outlet, said fan is on, and when said inlet shutter means closes said inlet and said outlet shutter means closes said outlet, said fan is off thereby preventing the escape of insecticide from said dispenser.

7. The dispenser of claim 6 wherein said insecticide plates are housed in a cassette which is mounted in and detachable from the main body of the dispenser.

8. The dispenser of claim 6 wherein said controller has an individual timer for specifying a particular type of operation within the range of operation set by the main timer.

9. The dispenser of claim 8 wherein said individual timer is a fly and mosquito timer for specifying operation at predetermined times.

10. The dispenser of claim 8 wherein said individual timer is a cockroach timer for specifying operation for a predetermined number of days at a time.

* * * * *